United States Patent [19]
Davis

[11] Patent Number: 6,060,577
[45] Date of Patent: May 9, 2000

[54] POLYCARBONATES DERIVED FROM ALICYCLIC BISPHENOLS

[75] Inventor: Gary Charles Davis, Albany, N.Y.

[73] Assignee: General Electric Company, Schenectady, N.Y.

[21] Appl. No.: 09/272,087

[22] Filed: Mar. 18, 1999

[51] Int. Cl.⁷ ..................................................... C08G 64/00
[52] U.S. Cl. ............................................ 528/196; 528/198
[58] Field of Search ...................................... 528/196, 198

[56] References Cited

U.S. PATENT DOCUMENTS

| | | | |
|---|---|---|---|
| 4,304,899 | 12/1981 | Mark et al. | 528/171 |
| 4,950,731 | 8/1990 | Faler et al. | 528/201 |
| 5,132,154 | 7/1992 | Westeppe et al. | 428/65 |
| 5,424,389 | 6/1995 | Friedl et al. | 528/201 |
| 5,633,060 | 5/1997 | Tokuda et al. | 428/64.1 |
| 5,859,833 | 1/1999 | Chatterjee et al. | 369/288 |

FOREIGN PATENT DOCUMENTS

| | | |
|---|---|---|
| 0016167 | 9/1984 | European Pat. Off. . |
| 3162413 | 7/1991 | Japan . |
| 3221523 | 9/1991 | Japan . |
| 3237130 | 10/1991 | Japan . |
| 441524 | 2/1992 | Japan . |
| 4345616 | 12/1992 | Japan . |
| 652585 | 7/1994 | Japan . |
| 96023 | 1/1997 | Japan . |
| 10176046 | 6/1998 | Japan . |

*Primary Examiner*—Terressa M. Boykin
*Attorney, Agent, or Firm*—Robert T. Barker; Noreen C. Johnson

[57] ABSTRACT

This invention relates to polycarbonates containing residues derived from alicyclic bisphenols or derivatives of alicyclic bisphenols; and optical articles formed from these polycarbonates. The polycarbonates have suitable properties for use in optical data storage media.

15 Claims, No Drawings

POLYCARBONATES DERIVED FROM ALICYCLIC BISPHENOLS

FIELD OF THE INVENTION

This invention relates to polycarbonates suitable for use in optical articles, and methods for making such polycarbonates. This invention further relates to optical articles, and methods for making optical articles from the polycarbonates. The polycarbonates contain residues derived from alicyclic bisphenols or derivatives of alicyclic bisphenols.

BACKGROUND OF THE INVENTION

Polycarbonates and other polymer materials are utilized in optical data storage media, such as compact disks. In optical data storage media, it is critical that polycarbonate resins have good performance characteristics such as transparency, low water affinity, good processibility, good heat resistance and low birefringence. High birefringence is particularly undesirable in high density optical data storage media.

Improvements in optical data storage media, including increased data storage density, are highly desirable, and achievement of such improvements is expected to improve well established and new computer technology such as read only, write once, rewritable, digital versatile and magneto-optical (MO) disks.

In the case of CD-ROM technology, the information to be read is imprinted directly into a moldable, transparent plastic material, such as bisphenol A (BPA) polycarbonate. The information is stored in the form of shallow pits embossed in a polymer surface. The surface is coated with a reflective metallic film, and the digital information, represented by the position and length of the pits, is read optically with a focused low power (5 mW) laser beam. The user can only extract information (digital data) from the disk without changing or adding any data. Thus, it is possible to "read" but not to "write" or "erase" information.

The operating principle in a WORM drive is to use a focused laser beam (20–40 mW) to make a permanent mark on a thin film on a disk. The information is then read out as a change in the optical properties of the disk, e.g., reflectivity or absorbance. These changes can take various forms: "hole burning" is the removal of material, typically a thin film of tellurium, by evaporation, melting or spalling (sometimes referred to as laser ablation); bubble or pit formation involves deformation of the surface, usually of a polymer overcoat of a metal reflector.

Although the CD-ROM and WORM formats have been successfully developed and are well suited for particular applications, the computer industry is focusing on erasable media for optical storage (EODs). There are two types of EODs: phase change (PC) and magneto-optic (MO). In MO storage, a bit of information is stored as a ~1 $\mu$m diameter magnetic domain, which has its magnetization either up or down. The information can be read by monitoring the rotation of the plane polarization of light reflected from the surface of the magnetic film. This rotation, called the Magneto-Optic Kerr Effect (MOKE) is typically less than 0.5 degrees. The materials for MO storage are generally amorphous alloys of the rare earth and transition metals.

Amorphous materials have a distinct advantage in MO storage as they do not suffer from "grain noise", spurious variations in the plane of polarization of reflected light caused by randomness in the orientation of grains in a polycrystalline film. Bits are written by heating above the Curie point, $T_C$, and cooling in the presence of a magnetic field, a process known as thermomagnetic writing. In the phase-change material, information is stored in regions that are different phases, typically amorphous and crystalline. These films are usually alloys or compounds of tellurium which can be quenched into the amorphous state by melting and rapidly cooling. The film is initially crystallized by heating it above the crystallization temperature. In most of these materials, the crystallization temperature is close to the glass transition temperature. When the film is heated with a short, high power focused laser pulse, the film can be melted and quenched to the amorphous state. The amorphized spot can represent a digital "1" or a bit of information. The information is read by scanning it with the same laser, set at a lower power, and monitoring the reflectivity.

In the case of WORM and EOD technology, the recording layer is separated from the environment by a transparent, non-interfering shielding layer. Materials selected for such "read through" optical data storage applications must have outstanding physical properties, such as moldability, ductility, a level of robustness compatible with popular use, resistance to deformation when exposed to high heat or high humidity, either alone or in combination. The materials should also interfere minimally with the passage of laser light through the medium when information is being retrieved from or added to the storage device.

As data storage densities are increased in optical data storage media to accommodate newer technologies, such as digital versatile disks (DVD) and higher density data disks for short or long term data archives, the design requirements for the transparent plastic component of the optical data storage devices have become increasingly stringent. In many of these applications, previously employed polycarbonate materials, such as BPA polycarbonate materials, are inadequate. Materials displaying lower birefringence at current, and in the future progressively shorter "reading and writing" wavelengths have been the object of intense efforts in the field of optical data storage devices.

Low birefringence alone will not satisfy all of the design requirements for the use of a material in optical data storage media; high transparency, heat resistance, low water absorption, ductility, high purity and few inhomogeneities or particulates are also required. Currently employed materials are found to be lacking in one or more of these characteristics, and new materials are required in order to achieve higher data storage densities in optical data storage media. In addition, new materials possessing improved optical properties are anticipated to be of general utility in the production of other optical articles, such as lenses, gratings, beam splitters and the like.

Birefringence in an article molded from polymeric material is related to orientation and deformation of its constituent polymer chains. Birefringence has several sources, including the structure and physical properties of the polymer material, the degree of molecular orientation in the polymer material and thermal stresses in the processed polymer material. For example, the birefringence of a molded optical article is determined, in part, by the molecular structure of its constituent polymer and the processing conditions, such as the forces applied during mold filling and cooling, used in its fabrication which can create thermal stresses and orientation of the polymer chains.

The observed birefringence of a disk is therefore determined by the molecular structure, which determines the intrinsic birefringence, and the processing conditions, which can create thermal stresses and orientation of the polymer chains. Specifically, the observed birefringence is typically a function of the intrinsic birefringence and the birefringence introduced upon molding articles, such as optical disks. The observed birefringence of an optical disk is typically quantified using a measurement termed "vertical birefringence" or VBR, which is described more fully below.

Two useful gauges of the suitability of a material for use as a molded optical article, such as a molded optical data storage disk, are the material's stress optical coefficient in the melt ($C_m$) and its stress optical coefficient in the glassy state ($C_g$), respectively. The relationship between $C_m$, $C_g$ and birefringence may be expresses as follows:

$$\Delta n = C_m \times \Delta\sigma_m \quad (1)$$

$$\Delta n = C_g \times \Delta\sigma_g \quad (2)$$

where $\Delta n$ is the measured birefringence and $\Delta\sigma_m$ and $\Delta\sigma_g$ are the applied stresses in the melt and glassy states, respectively. The stress optical coefficients $C_m$ and $C_g$ are a measure of the susceptibility of a material to birefringence induced as a result of orientation and deformation occurring during mold filling and stresses generated as the molded article cools.

The stress optical coefficients $C_m$ and $C_g$ are useful as general material screening tools and may also be used to predict the vertical birefringence (VBR) of a molded article, a quantity critical to the successful use of a given material in a molded optical article. For a molded optical disk, the VBR is defined as:

$$VBR = (n_r - n_z) = \Delta n_{rz} \quad (3)$$

where $n_r$ and $n_z$ are the refractive indices along the r an z cylindrical axes of the disk; $n_r$ is the index of refraction seen by a light beam polarized along the radial direction, and $n_z$ is the index of refraction for light polarized perpendicular to the plane of the disk. The VBR governs the defocusing margin, and reduction of VBR will lead to alleviation of problems which are not correctable mechanically.

In the search for improved materials for use in optical articles, Cm and Cg are especially useful since they require minimal amounts of material and are relatively insensitive to uncontrolled measurement parameters or sample preparation methods, whereas measurement of VBR requires significantly larger amounts of material and is dependent upon the molding conditions. In general, it has been found that materials possessing low values of $C_g$ and $C_m$ show enhanced performance characteristics, for example VBR, in optical data storage applications relative to materials having higher values of $C_g$ and $C_m$. Therefore, in efforts aimed at developing improved optical quality, widespread use of $C_g$ and $C_m$ measurements is made in order to rank potential candidates for such applications and to compare them with previously discovered materials.

In applications requiring higher storage density, the properties of low birefringence and low water absorption in the polymer material from which the optical article is fabricated become even more critical. In order to achieve higher data storage density, low birefringence is necessary so as to minimally interfere with the laser beam as it passes through the optical article, for example a compact disk.

Another critical property needed for high data storage density applications is disk flatness. It is known that excessive moisture absorption results in disk skewing which in turn leads to reduced reliability. Since the bulk of the disk is comprised of the polymer material, the flatness of the disk depends on the low water absorption of the polymeric material. In order to produce high quality disks through injection molding, the polymer, such as polycarbonate should be easily processed.

U.S. Pat. No. 4,950,731 discloses polycarbonate materials or use in optical materials derived from bisphenol A and SBI. Bisphenol A polycarbonate has high stress optical coefficient in the melt phase ($C_m$) and a high stress optical coefficient in the glassy state ($C_g$) which is moderated by the incorporation of 6,6'-dihydroxy-3,3,3',3'-tetramethylspirobiindane (SBI), the homopolycarbonate of which has a negative $C_m$ value. Copolycarbonates prepared from BPA and SBI have been shown to possess stress optical coefficients in the melt ($C_m$) of zero or near zero. Such copolymers lack the processibility of bisphenol A polycarbonate, however, and have higher affinity for water.

U.S. Pat. No. 5,132,154 discloses polycarbonate mixtures in optical applications. The polycarbonate resin comprises units which contain a bisphenol having an alicyclic ring structure, which is substituted by alkyl groups on at least one member of the ring structure. Such polymers are not the subject of this invention.

Japanese Kokai Patent Application No. 3-237130 discloses a polyether resin for use in optical materials. The disclosure relates to polyether resin and not polycarbonate resin, see page 4, last line.

Japanese Kokai Patent Application No. 4-41524 discloses a polyester carbonate for use in optical materials. The polyester carbonate resin comprises units derived from phthalic acid. Such polymers are not the subject of this invention.

Japanese Kokai Patent Application No. 3-221523 discloses a polyformal resin for use in optical articles obtained by the reaction of a divalent phenolic compound and a dihalogen compound. The reference does not relate to polycarbonate resins as disclosed on page 4, and characterizes polycarbonate resin as exhibiting high birefringence, as disclosed on page 4, lines 8–11.

Japanese Kokai Patent Application No. 3-162413 discloses a polymer for use in optical materials. The polymer comprises residues of spirobichroman. Such polymers are not the subject of this invention.

Japanese Kokai Patent Application No. 10-176046 discloses a polycarbonate copolymer for use in optical articles comprising residues of 2-2-bis(3-tert-butyl-4-hydroxy-6-methylphenyl)-n-butane. Such polymers are not the subject of this invention.

Japanese Kokai Patent Application No. 4-345616 discloses a polycarbonate which may be used in optical recording media, the polycarbonate comprising BPA or other aromatic hydroxy compounds and SBI.

Japanese Kokai Patent Application No. 9-6023 discloses a copolymer binder with abrasion resistance and cracking resistance for use in photoresists. There is no disclosure of optical materials having birefringence and other properties suitable for use in optical articles, or optical articles made from these materials.

Examined Japanese Patent No. 06-52585 discloses a copolymer which may be used in optical materials. The starting materials may include bisphenols such as 1,1-bis (4'-hydroxyphenyl)cyclohexane.

U.S. Pat. No. 5,858,833 and EP 0846711 disclose optical disk grade copolyestercarbonates derived from hydroxyphenylindanols, having units derived from 6-hydroxy-1-(4'-hydroxyphenyl)-1,3,3-trimethylindane (CD-1).

U.S. Pat. No. 4,304,899 and EP 0016167 disclose polycarbonate compositions having improved barrier properties. The disclosures do not teach compositions for use in optical media.

U.S. Pat. No. 5,424,389 discloses copolymers of bisphenol A and SBI for use in optical applications. Such copolymers are not the subject of this invention.

U.S. Pat. No. 5,633,060 discloses an optical disk substrate derived from 1,1-bis(4-hydroxyphenyl)-3,3,5-trimethylcyclohexane (BPI). Additionally the polycarbonate may comprise units derived from 4,4'-(m-phenylenediisopropylidene)diphenol and/or 2,2-bis(3-methyl-4-hydroxyphenyl)propane. Polycarbonates based on BPI are not the subject of this invention.

There exists a need for compositions having good optical properties and good processibility and which are suitable for use in high density optical recording media. Polycarbonates manufactured by copolymerizing the aforementioned aromatic dihydroxy compounds, such as bisphenol A, with other monomers, such as SBI, may produce acceptable birefringence; however the glass transition temperature is often too high, resulting in poor processing characteristics. Consequently, the obtained moldings have low impact resistance. Further, the water absorption of such polycarbonates is unacceptable for higher density applications.

SUMMARY OF THE INVENTION

The present invention solves these problems, and provides further surprising properties. These and further objects of the invention will be more readily appreciated when considering the following disclosure and appended claims.

In one aspect, the invention relates to polycarbonates comprising:

(a) carbonate structural units corresponding to structure (I)

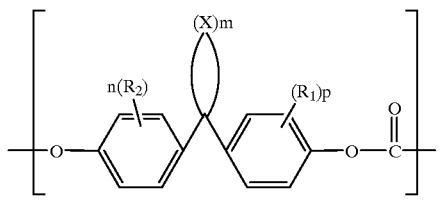

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position;

(b) carbonate structural units selected from the group consisting of (1) carbonate structural units corresponding to

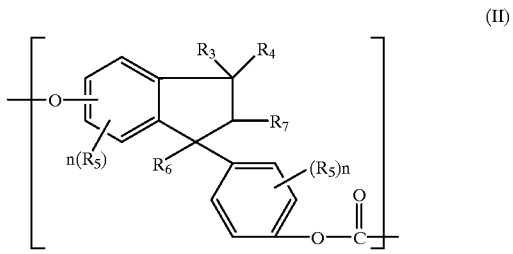

where $R_3$, $R_4$ and $R_6$ independently represent $C_1$–$C_6$ alkyl, each $R_5$ is independently selected from the group consisting of H and $C_1$–$C_3$ alkyl and each n independently selected from the group consisting of 0, 1 and 2, $R_7$ is H or $C_1$–$C_5$ alkyl, (2) carbonate structural units corresponding to

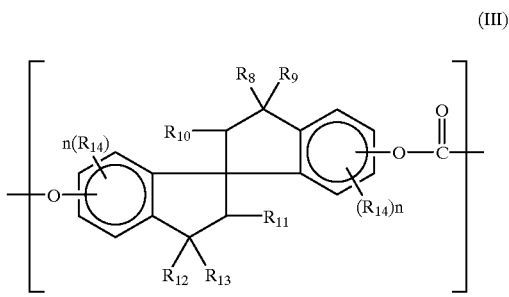

where $R_8$, $R_9$, $R_{12}$ and $R_{13}$ are independently $C_1$–$C_6$ alkyl, $R_{10}$ and $R_{11}$ are independently H or $C_1$–$C_5$ alkyl, each $R_{14}$ is independently selected from the group consisting of H and $C_1$–$C_3$ alkyl and each n is independently selected from the group consisting of 0, 1 and 2;

(3) carbonate structural units corresponding to

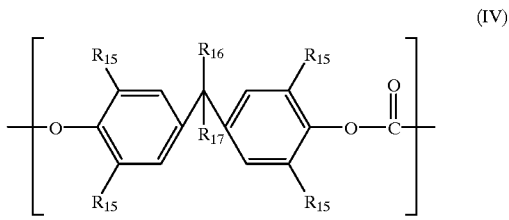

where $R_{15}$ is selected independently from the group consisting of H and $C_1$–$C_3$ alkyl, and $R_{16}$ and $R_{17}$ are independently $C_1$–$C_6$ alkyl or aryl;

(4) carbonate structural units corresponding to a mixture of structures (II) and (III); and (5) carbonate structural units corresponding to a mixture of structures (III) and (IV), where the polycarbonate has a glass transition temperature of from about 120° C. to about 185° C. and a water absorption of below about 0.33%.

This invention further relates to method of making these polycarbonates, optical articles made from these polycarbonates, and methods of making optical articles from these polycarbonates.

In another aspect, the invention relates to optical articles comprising:

(1) from 90 to 100% by weight of a polycarbonate comprising structural units of the formula (I)

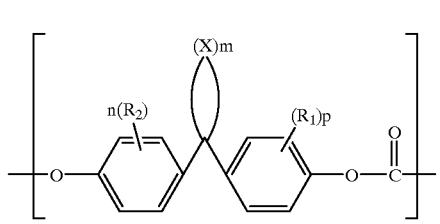

(I)

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from 90 to 100 mol % of the polycarbonate; and (2) from 0 to 10% by weight of further additives;

where the polycarbonate has a glass transition temperature of from about 120° C. to about 185° C. and a water absorption of below about 0.33%.

The invention further relates to methods of making optical articles from these compositions. In one embodiment of this invention, structure (I) is 1,1-bis(4-hydroxy-3-methyl phenyl)cyclohexane (BCC), and in another embodiment, the polycarbonate is a homopolycarbonate of BCC.

DETAILED DESCRIPTION OF THE INVENTION

The present invention may be understood more readily by reference to the following detailed description of preferred embodiments of the invention and the Examples included therein.

Before the present compositions of matter and methods are disclosed, it is to be understood that this invention is not limited to specific synthetic methods or to particular formulations, as such may, of course, vary. It is also to be understood that the terminology used herein is for the purpose of describing particular embodiments only and is not intended to be limiting.

In this specification and in the claims which follow, reference will be made to a number of terms which shall be defined to have the following meanings.

The singular forms "a," "an" and "the" include plural referents unless the context clearly dictates otherwise.

"Optional" or "optionally" means that the subsequently described event or circumstances may or may not occur, and that description includes instances where the event or circumstance occurs and instances where it does not.

"BPA" is herein defined as bisphenol A or 2,2-bis(4-hydroxyphenyl)propane.

"SBI" is herein defined as 6,6'-dihydroxy-3,3,3',3'-tetramethylspirobiindane.

"BCC" is herein defined as 1,1-bis(4-hydroxy-3-methyl phenyl)cyclohexane.

"CD-1" is herein defined as 6-hydroxy-1-(4'-hydroxyphenyl)-1,3,3-trimethylindane.

"$C_g$" is the stress optical coefficient of a polymeric material in the glassy state, measured in Brewsters ($10^{-13}$ $cm^2$/dyne)

"$C_m$" is the stress optical coefficient in the melt phase, measured in Brewsters ($10^{-13}$ $cm^2$/dyne)

"Polycarbonate" or "polycarbonates" as used herein includes copolycarbonates, homopolycarbonates and (co) polyester carbonates.

"Optical articles" as used herein includes optical disks and optical data storage media, for example a compact disk (CD audio or CD-ROM), a digital versatile disk, also known as DVD (ROM, RAM, rewritable), a magneto optical (MO) disk and the like; optical lenses, such as contact lenses, lenses for glasses, lenses for telescopes, and prisms; optical fibers; information recording media; information transferring media; high density data storage media, disks for video cameras, disks for still cameras and the like; as well as the substrate onto which optical recording material is applied. In addition to use as a material to prepare optical articles, the polycarbonate may be used as a raw material for films or sheets.

Unless otherwise stated, "mol %" in reference to the composition of a polycarbonate in this specification is based upon 100 mol % of the repeating units of the polycarbonate. For instance, "a polycarbonate comprising 90 mol % of BCC" refers to a polycarbonate in which 90 mol % of the repeating units are residues derived from BCC diphenol or its corresponding derivative(s). Corresponding derivatives include but are not limited to, corresponding oligomers of the diphenols; corresponding esters of the diphenol and their oligomers; and the corresponding chloroformates of the diphenol and their oligomers.

The terms "residues" and "structural units", used in reference to the constituents of the polycarbonate, are synonymous throughout the specification.

Throughout this application where publications are referenced, the disclosures of these publications in their entireties are hereby incorporated by reference into this application in order to more fully describe the state of the art to which this invention pertains.

I Polycarbonate Suitable for Use In Optical Articles

As mentioned, in one aspect, this invention relates to polycarbonates and methods for preparing polycarbonates, the polycarbonate comprising:

(a) carbonate structural units corresponding to structure (I)

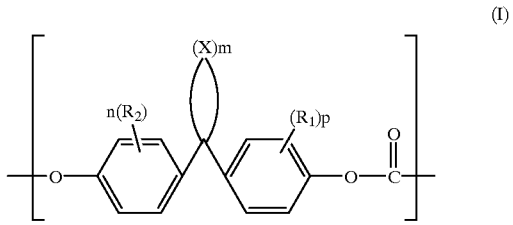

(I)

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position;

(b) carbonate structural units selected from the group consisting of
(1) carbonate structural units corresponding to

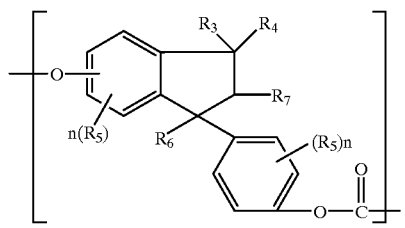
(II)

where $R_3$, $R_4$ and $R_6$ independently represent $C_1–C_6$ alkyl,
each $R_5$ is independently selected from the group consisting of H and $C_1–C_3$ alkyl and each n independently selected from the group consisting of 0, 1 and 2,
$R_7$ is H or $C_1–C_5$ alkyl,
(2) carbonate structural units corresponding to

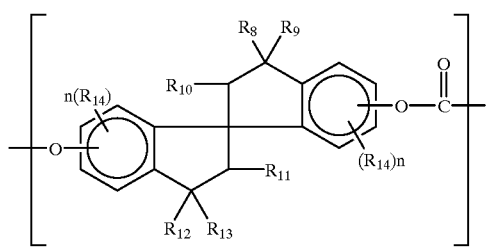
(III)

where $R_8$, $R_9$, $R_{12}$ and $R_{13}$ are independently $C_1–C_6$ alkyl,
$R_{10}$ and $R_{11}$ are independently H or $C_1–C_5$ alkyl,
each $R_{14}$ is independently selected from the group consisting of H and $C_1–C_3$ alkyl and each n is independently selected from the group consisting of 0, 1 and 2;
(3) carbonate structural units corresponding to

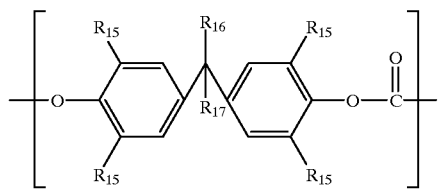
(IV)

where $R_{15}$ is selected independently from the group consisting of H and $C_1–C_3$ alkyl, and $R_{16}$ and $R_{17}$ are independently $C_1–C_6$ alkyl or aryl;
(4) carbonate structural units corresponding to structures (II) and (III); and
(5) carbonate structural units corresponding to structures (III) and (IV),
where the polycarbonate has a glass transition temperature of from about 120° C. to about 185° C. and a water absorption of below about 0.33%.

The present invention has solved the aforementioned problems of processability and water absorption, and provides a composition having good processability and low water absorption. The composition further provides polycarbonates having good optical properties and suitable glass transition temperatures, and which are suitable for use in optical articles. Suitable glass transition temperatures are necessary to provide adequate processability, for example good molding characteristics.

Further, the applicants have found that polycarbonates comprising the disclosed carbonate structural units are suitable for use in high data storage density optical media. In particular the polycarbonates of the present invention have good transparency, low water absorption, a suitable stress optical coefficient, good processability, and good thermal stability.

Applicants have also unexpectedly found that polycarbonates comprising units of the structure:

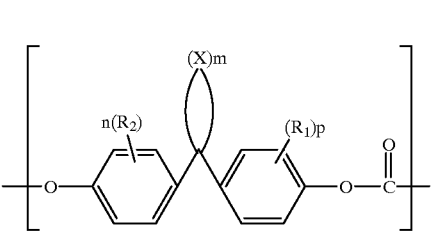
(I)

where $R_1$ and $R_2$ are independently selected from the group consisting of $C_1–C_6$ alkyl;
X represents $CH_2$;
m is an integer from 4 to 7;
n is an integer from 1 to 4; and
p is an integer from 1 to 4
with the proviso that at least one of $R_1$ or $R_2$ is in the 3 or 3' position,
exhibit lower affinity for water and have unexpectedly low $C_g$ values, in particular $C_g$ values below about 60 Brewsters. It is critical that the structural units of formula I be substituted in the 3 or 3' position by at least one of $R_1$ or $R_2$. It is preferable that n and p are equal to one, and that $R_1$ and $R_2$ are present in the 3 and 3' positions, respectively, as follows:

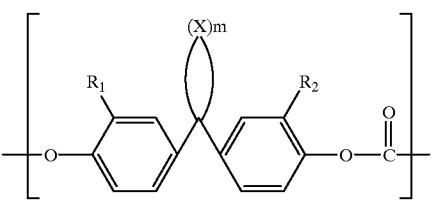

$R_1$ and $R_2$ are preferably $C_1–C_6$ alkyl, more preferably $C_1–C_3$ alkyl, even more preferably $CH_3$. The polycarbonate should comprise at least about 30 mol % of units of structure I to achieve an acceptable degree of low water absorption for use in optical applications. These polycarbonates were further found to have acceptable $C_m$ values, i.e. below about 3,000 Brewsters.

In the present invention it is further critical that the polyarbonates posses other suitable properties for use in optical media. The polycarbonates of this invention preferably have glass transition temperatures in the range of 120° to 185° C., more preferably 125° to 165° C., even more preferably 130° to 150° C. The water absorption of the polycarbonates is preferably below 0.33%, even more preferably less than about 0.2%.

The number average molecular weight ($M_w$) of the polycarbonate, as determined by gel permeation chromatography relative to polystyrene, is preferably from about 10,000 to about 100,000, more preferably between about 10,000 to about 50,000, even more preferably between about 12,000 to about 40,000.

The polycarbonate should have light transmittance of at least about 85%, more preferably at least about 90% and a $C_g$ of less than about 60 Brewsters, more preferably less than 55 Brewsters, even more preferably less than 50 Brewsters. The polycarbonate preferably has a $C_m$ of below about 3,000 Brewsters, more preferably below about 2,500 Brewsters, even more preferably less than about 2,450 Brewsters.

The compositions of a particular polycarbonate may be varied within certain ranges to achieve the suitable property profile. The following discussion sets forth illustrative ranges for the desired embodiments.

In the embodiment where structure (II) is selected as component b), component a) preferably comprises from 30 to 99 mol %, even more preferably 60 to 99 mol % of the polycarbonate. Carbonate units of structure (II) preferably comprise from 1 to 70 mol %, more preferably from 1 to 40 mol % of the polycarbonate. Optionally the polycarbonate may comprise from 0.1 to 20 mol % of structural units of structure (V):

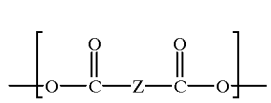
(V)

wherein Z is a $C_1$–$C_{40}$ branched or unbranched alkyl or branched or unbranched cycloalkyl.

Representative units of component a) include, but are not limited to residues of 1,1-bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. Residues of BCC are most preferred as component a). Representative units of component b) include, but are not limited to residues of 6-hydroxy-1-(4'-hydroxyphenyl)-1,3,3-trimethylindane (CD-1); 6-hydroxy-1-(4'-hydroxy-3'-methylphenyl)-1,3,3,5-tetramethylindane. Residues of CD-1 are most preferred as component b).

Representative units of structure (V) include, but are not limited, to residues of dodecanedioic acid, sebacic acid, adipic acid, octadecanedioic acid, octadec-9 enedioic acid, 9-carboyxoctadecanoic acid and 10-carboxyoctadecanoic acid. Residues of dodecanedioic acid (DDDA) are the more preferred.

In the embodiment where structure (III) is selected as component b), component a) preferably comprises from about 30 to 99 mol % of the polycarbonate, even more preferably from about 60 to 99 mol % of the polycarbonate. Carbonate units of structure (III) preferably comprise from about 1 to about 70 mol % of the polycarbonate, even more preferably form about 1 to about 40 mol % of the polycarbonate. Optionally, the polycarbonate may comprise from 0.1 to 20 mol % of carbonate units of structure (V), as defined.

Representative units of component a) include, but are not limited to residues of 1,1 -bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. Residues of BCC are most preferred as component a). Representative units of component b) include, but are not limited to residues of 6,6'-dihydroxy-3,3,3',3'-tetramethyl spirobiindane (SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy 3,3,3',3'-tetramethylspirobiindane and mixtures thereof. Residues of SBI and its ortho alkylated homologs are most preferred as component b).

Representative units of structure (V) include, but are not limited to, residues of dodecanedioic acid, sebacic acid, adipic acid, octadecanedioic acid, octadec-9-enedioic acid, 9-carboxyoctadecanoic acid and 10-carboxyoctadecanoic acid. Residues of dodecanedioic acid are the more preferred.

In the embodiment where structure (IV) is selected as component b), component a) preferably comprises from 30 to 99 mol % of the polycarbonate, more preferably from 60 to 99 mol % of the polycarbonate. Carbonate units of structure (IV) preferably comprise from 1.0 to 70 mol % of the polycarbonate, even more preferably from 1.0 to 40 mol % of the polycarbonate, except in the case where component b) is selected to be residues of BPA exclusively, i.e. 100 mol %, based on 100 mol % of repeating units b) in the polycarbonate. In this case, the structural units corresponding to BPA comprise from 0.1 to 50 mol % of the polycarbonate; it is further preferable in this case that component a) comprise at least 50 mol % of the polycarbonate; more preferably component a) is selected to be residues of BCC in this case.

In the case where structure (IV) is selected as component b), component b) is selected to be exclusively BPA (i.e. 100 mol %, based on 100 mol % of repeating units of b) in the polycarbonate) and the optical article to be formed from the polycarbonate is optical data storage media or a substrate for optical data storage media requiring $C_m$ of 3000 or less and $C_g$ of 50 Brewsters or less, it is particularly preferred that the polycarbonate comprise no more than 20 mol % of residues of BPA. In this case, the polycarbonate preferably comprises from 80 to 85 mol % BCC and from 15 to 20 mol % BPA. In one embodiment the polycarbonate is 80 mol % of residues of BCC and 20 mol % of residues of BPA.

In the embodiment where structure (IV) is selected as component b), the polycarbonate may optionally comprise from 0.1 to 20 mol % of carbonate structural units of structure (V) as defined above.

Representative units of component a) include, but are not limited to residues of 1,1-bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. Residues of BCC are preferred as component a). Representative units of component b) in the embodiment where structure (IV) is selected as component b) include, but are not limited to residues of 2,2-bis(4-hydroxyphenyl)propane (BPA); 2,2-bis(4-hydroxyphenyl)butane; 2,2-bis(4-hydroxyphenyl)pentane; 2,2-bis(4-hydroxy-3-methylphenyl)propane; 2,2-bis(3-ethyl-4-hydroxyphenyl)propane; and mixtures thereof. Residues of BPA are preferred as component b) in this embodiment.

Representative units of structure (V) include, but are not limited to, residues of dodecanedioic acid, sebacic acid, adipic acid, octadecanedioic acid, octadec-9-enedioic acid, 9-carboxyoctadecanoic acid and 10-carboxyoctadecanoic acid. Residues of dodecanedioic acid are the more preferred.

In the embodiment where mixtures of structures (II) and (III) are selected as component b), component a) preferably comprises from 30 to 99 mol % of the polycarbonate, even more preferably 60 to 99 mol % of the polycarbonate. Carbonate structural units of formulas (II) and (III) preferably comprise from 1 to 70 mol % of the polycarbonate, even more preferably 1 to 40 mol % of the polycarbonate. The ratio of structural units (II) to (III) is preferably in the range of 1:99 to 99:1. Optionally, the polycarbonate in this embodiment may comprise from 0.1 to 20 mol % of structure (V) as defined above.

Representative units of component a), include, but are not limited to residues of 1,1-bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. BCC is most preferred as component a). Representative units of component b) in this embodiment include, but are not limited to 6-hydroxy-1-(4'-hydroxyphenyl)-1,3,3-trimethylindane (CD-1); 6-hydroxy-1-(4'-hydroxy-3'-methylphenyl)-1,3,3,5-tetramethylindane; and 6,6'-dihydroxy-3,3,3',3'-tetramethyl spirobiindane (SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy-3,3,3', 3'-tetramethylspirobiindane. Residues of CD-1 and SBI are most preferred as structures (II) and (III), respectively.

Representative units of structure (V) in this embodiment include, but are not limited to residues of dodecanedioic acid, sebacic acid, adipic acid, octadecanedioic acid, octadec-9-enedioic acid, 9 -caroxyoctadecanoic acid and 10-carboxyoctadecanoic acid. Residues of dodecanedioic acid are the more preferred acid.

In the embodiment where structures (III) and (IV) are selected as component b), component a) preferably comprises from 30 to 99 mol % of the polycarbonate, even more preferably from 60 to 99 mol % of the polycarbonate. Carbonate structural units of formulas (III) and (IV) preferably comprise from 1 to 70 mol % of the polycarbonate, even more preferably from 1 to 40 mol % of the polycarbonate. The ratio of structural units (III) to (IV) is preferably in the range of 1:99 to 99:1. Optionally, the polycarbonate in this embodiment may comprise from about 0.1 to 20 mol % of structure (V) as defined above.

Representative units of component a) include, but are not limited to residues of 1,1-bis(4-hydroxy-3-methylphenyl) cyclohexane (BCC); 1,1-bis(4-hydroxy-3-methylphenyl) cyclopentane; 1,1-bis(4-hydroxy-3-methylphenyl) cycloheptane and mixtures thereof. Residues of BCC are most preferred as component a). Representative units of component b) in the embodiment where structures (III) and (IV) are selected as component b), include, but are not limited to, residues of 6,6'-dihydroxy-3,3,3',3'-tetramethyl spirobiindane (SBI); 6,6'-dihydroxy-3,3,5,3',3',5'-hexamethyl spirobiindane; 6,6'-dihydroxy-3,3,5,7,3',3',5',7'-octamethylspirobiindane; 5,5'-diethyl-6,6'-dihydroxy-3,3,3', 3'-tetramethylspirobiindane; and residues of 2,2-bis(4-hydroxyphenyl)propane (BPA); 2,2-bis(4-hydroxyphenyl) butane; 2,2-bis(4-hydroxyphenyl)pentane; 2,2-bis(4-hydroxy-3-methylphenyl)propane; 2,2-bis(3-ethyl-4-hydroxyphenyl)propane; and mixtures thereof. Residues of SBI and BPA are most preferred as structures (III) and (IV), respectively.

Representative units of structure (V) in this embodiment include, but are not limited to residues of dodecanedioic acid, sebacic acid, adipic acid, octadecanedioic acid, octadec-9-enedioc acid, 9-carboxyoctadecanoic acid and 10-carboxyoctadecanoic acid. Residues of dodecanedioic acid are the more preferred.

The polycarbonates of the invention may be prepared by the interfacial or the melt process. If the interfacial process is used, the addition of various phase transfer catalysts is optional. Phase transfer catalysts which are suitable include, but are not limited to tertiary amines, such as triethylamine, ammonium salts, such as tetrabutylammonium bromide; or hexaethylguanidium chloride. Monofunctional phenols, such as p-cumylphenol and 4-butylphenol; long chain alkylphenols, such as cardanol and nonyl phenol; and difunctional phenols may be used as chain stopping agents. Optionally 0.1 to 10 mole %, more preferably 1 to 5 mole % of chainstopping agent may be incorporated into the polycarbonate, based on the total moles of the repeating units.

In some instances, the phosgenation conditions must be adjusted. In particular, the phosgenation conditions should be adjusted in cases where the formation of undesired cyclic oligomers is favored by the characteristic reactivity of the monomer, which is related to monomer solubility in the reaction medium and monomer structure. In the case of BCC, for example, cyclic oligomer formation occurs to a greater extent under standard interfacial polymerization conditions than in the case of, for example, BPA. In polycarbonates containing substantial more than about 20 mol % of BCC, it is advantageous to use an excess of phosgene to promote the formation of linear bischloroformate oligomers which are converted to high molecular weight polymers by partial hydrolysis and polycondensation. Preferably from about 20 to 200 mol % of excess phosgene is used.

The polycarbonates of the invention may also be prepared by the melt or transesterification process. This process does not require the use of phosgene or a solvent and minimizes the formation of low molecular weight contaminants, such as cyclic and linear low molecular weight oligomers in the final polymer. The monomers are mixed with a carbonate source, such as a diarylcarbonate, and a small amount of catalyst, such as an alkali metal hydroxide or ammonium hydroxide and heated under a vacuum according to a protocol in which the temperature is raised through a series of stages while the pressure in the headspace over the reaction mixture is lowered from ambient pressure to about 1 torr.

Suitable carbonate sources, catalysts and reaction conditions are found in U.S. Pat. No. 5,880,248, and *Kirk-Othmer Encyclopedia of Chemical Technology*, Fourth Edition, Volume 19, pp. 585–600, herein incorporated by reference. The time of the stages and the temperature are such that mechanical losses of material through foaming and the like are avoided. Phenol and excess diphenyl carbonate are removed overhead to complete the polymerization process. The product high polymer is then isolated as a melt which may be compounded with other additives, such as stabilizers and mold release agents prior to pelletization. The products produced by the melt process have reduced numbers of undissolved particles and reduced content of low molecular weight contaminants, such as cyclic oligomers, relative to the interfacially produced product.

It was unexpectedly found that for a preferred embodiment of the invention, where the polycarbonate comprises 84 mol % BCC and 16 mol % SBI, the melt process produced a superior product. In particular, the melt process produced a polycarbonate having a $C_g$ of 38 Brewsters. For the same composition produced by the interfacial process, the polycarbonate was found to have a $C_g$ of 45.1 Brewsters.

In this embodiment, the polycarbonate preferably has a $T_g$ below about 150° C., a water absorption below about 0.2% a $C_g$ below about 50 Brewsters and a $C_m$ of less than about 2500 Brewsters.

The method to prepare the polycarbonate comprising 84 mol % BCC and 16 mol % SBI preferably comprises the steps of:

A) mixing BCC monomer and SBI monomer in a molar ratio of BCC:SBI of 84:16 with a carbonate source in the presence of a catalyst, thereby forming a reaction mixture;

B) heating the reaction mixture until the reaction mixture melts;

C) thermally equilibrating the mixture; and

D) increasing the molecular weight by removing volatile components from the reaction mixture in one or more reaction stages.

The volatile components include phenol and excess diphenyl carbonate. The number average molecular weight ($M_w$) of the polycarbonate comprising 84 mol % BCC and 16 mol % SBI, as determined by gel permeation chromotography relative to polystyrene, is preferably from about 10,000 to about 100,000, more preferably between about 10,000 to about 50,000, even more preferably between about 12,000 to about 40,000.

The polycarbonates of the present invention may optionally be blended with any conventional additives used in optical applications, including but not limited to dyestuffs, UV stabilizers, antioxidants, heat stabilizers, and mold release agents, to form an optical article. In particular, it is preferable to form a blend of the polycarbonate and additives which aid in processing the blend to form the desired optical article. The blend may optionally comprise from 0.0001 to 10% by weight of the desired additives, more preferably from 0.0001 to 1.0% by weight of the desired additives.

Substances or additives which may be added to the polycarbonates of this invention, include, but are not limited to, heat-resistant stabilizer, UV absorber, mold-release agent, antistatic agent, slip agent, antiblocking agent, lubricant, anticlouding agent, coloring agent, natural oil, synthetic oil, wax, organic filler, inorganic filler and mixtures thereof.

Examples of the aforementioned heat-resistant stabilizers, include, but are not limited to, phenol stabilizers, organic thioether stabilizers, organic phosphide stabilizers, hindered amine stabilizers, epoxy stabilizers and mixtures thereof. The heat-resistant stabilizer may be added in the form of a solid or liquid.

Examples of UV absorbers include, but are not limited to, salicylic acid UV absorbers, benzophenone UV absorbers, benzotriazole UV absorbers, cyanoacrylate UV absorbers and mixtures thereof.

Examples of the mold-release agents include, but are not limited to natural and synthetic paraffins, polyethylene waxes, fluorocarbons, and other hydrocarbon mold-release agents; stearic acid, hydroxystearic acid, and other higher fatty acids, hydroxyfatty acids, and other fatty acid mold-release agents; stearic acid amide, ethylenebisstearoamide, and other fatty acid amides, alkylenebisfatty acid amides, and other fatty acid amide mold-release agents; stearyl alcohol, cetyl alcohol, and other aliphatic alcohols, polyhydric alcohols, polyglycols, polyglycerols and other alcoholic mold release agents; butyl stearate, pentaerythritol tetrastearate, and other lower alcohol esters of fatty acid, polyhydric alcohol esters of fatty acid, polyglycol esters of fatty acid, and other fatty acid ester mold release agents; silicone oil and other silicone mold release agents, and mixtures of any of the aforementioned.

The coloring agent may be either pigments or dyes. Inorganic coloring agents and organic coloring agents may be used separately or in combination in the invention.

The polycarbonates may be random copolymers, block copolymers or graft copolymers. When graft copolymers and other branched polymers are prepared a suitable branching agent is used during production.

The desired optical article may be obtained by molding the polycarbonate or polycarbonate blend by injection molding, compression molding, extrusion methods and solution casting methods. Injection molding is the more preferred method of forming the article.

Because the polycarbonates of the present invention possess advantageous properties such as low water absorption, good processibility and low birefringence, they can be advantageously utilized to produce optical articles. End-use applications for the optical article of the invention include, but are not limited to, a digital audio disk, a digital versatile disk, an optical memory disk, a compact disk, an ASMO device and the like; optical lenses, such as contact lenses, lenses for glasses, lenses for telescopes, and prisms; optical fibers; magneto optical disks; information recording media; information transferring media; disks for video cameras, disks for still cameras and the like.

The polycarbonate may function as the medium for data storage, i.e. the data may be fixed onto or into the polycarbonate. The polycarbonate may also function as the substrate onto which a data storage medium is applied. Further, some combination of both functions may be employed in a single device, as for instance when the polycarbonate is imprinted with tracking to aid in reading a data storage medium which is applied to the polycarbonate.

II. Optical Articles Containing at Least 90 wt % of a Polycarbonate Derived from Alicyclic Bisphenols and Polycarbonates of Alicyclic Bisphenols In a further aspect, the invention relates to an optical article comprising:

(1) from 90 to 100% by weight of a polycarbonate having carbonate structural units corresponding to structure (I):

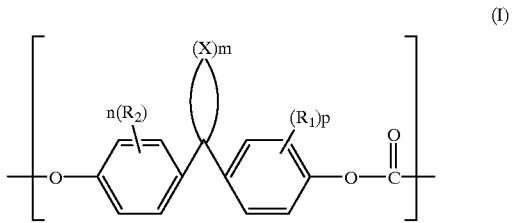

where $R_1$ and $R_2$ are independently selected from the group consisting of $C_1-C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from 90 to 100 mol % of the polycarbonate; and (2) from 0 to 10% by weight of further additives;

where the polycarbonate has a glass transition temperature of from about 120° C. to about 185° C. and a water absorption of below about 0.33%.

The invention further relates to the polycarbonates comprising the optical article as defined above, the polycarbonates having carbonate structural units corresponding to structure (I):

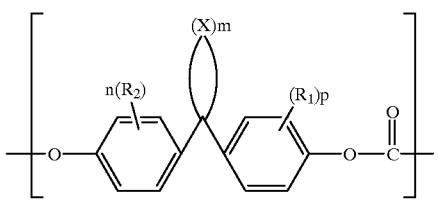

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from 90 to 100 mol % of the polycarbonate; and where the polycarbonate has a glass transition temperature of from about 120° C. to about 185° C. and a water absorption of below about 0.33%.

In one embodiment of the invention, the polycarbonate is 100 mol % of residues BCC. In the embodiment where the polycarbonate is 100 mol % of residues of BCC, the polycarbonate has a glass transition temperature of below about below about 150° C. and a water absorption of below about 0.15%. The homopolycarbonate has a $C_g$ of below about 50 Brewsters and a $C_m$ of below about 2500 Brewsters.

Representative units of structure (I) in the polycarbonate, include, but are not limited to residues of 1,1-bis(4-hydroxy-3-methylphenyl)cyclohexane (BCC); 1,1-bis(4-hydroxy-3-methylphenyl)cyclopentane; 1,1-bis(4-hydroxy-3-methylphenyl)cycloheptane and mixtures thereof. Residues of BCC are most preferred as component a). The bisphenols corresponding to structure (I) are herein referred to as "alicyclic bisphenols".

In one embodiment of the optical article as defined, component (1) of the optical article is a polycarbonate of 100 mol % of residues of BCC, structure (VI). BCC may be easily synthesized from cyclohexanone and ortho-cresol.

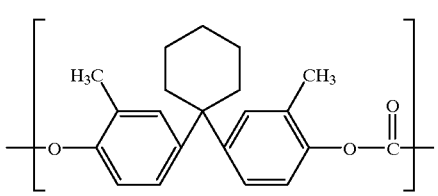

A polycarbonate, comprising 100 mol % of structural units derived from BCC, is herein referred to as "BCC homopolycarbonate".

It was unexpectedly found that polycarbonates comprising 90 to 100 mol % of structure (I) possess unexpectedly low values for $C_g$, as well as low water affinity, and suitable processibility, and are particularly suited for use in optical articles. It is critical that the structural units of formula (I) be substituted in the 3 or 3' position by at least one of $R_1$ or $R_2$. It is preferable that n and p are equal to one, and that $R_1$ and $R_2$ are present in the 3 and 3' positions, respectively. $R_1$ and $R_2$ are preferably $C_1$–$C_6$ alkyl, more preferably $C_1$–$C_3$ alkyl, even more preferably $CH_3$. It was further found that polycarbonates comprising 90 to 100 mol % of units of structural formula (I) possess acceptable $C_m$ values, i.e. values below about 3,000 Brewsters.

In the present invention it is further critical that the polycarbonates posses suitable properties for use in optical articles. The polycarbonates of the further aspect of the invention preferably have glass transition temperatures in the range of 120° to 185° C., more preferably 125° to 165° C., even more preferably 130 to 150° C. The water absorption of the polycarbonates is preferably below 0.33%, even more preferably less than about 0.2%.

The weight average molecular weight ($M_w$), as determined by gel permeation chromotagraphy relative to polystyrene, of the polycarbonates is preferably from about 10,000 to about 100,000, more preferably between about 10,000 to about 50,000, even more preferably between about 20,000 to about 30,000.

The polycarbonates should have light transmittance of at least about 85%, more preferably at least about 90% and a $C_g$ of less than about 60 Brewsters, more preferably less than 50 Brewsters. The polycarbonates preferably have a $C_m$ of below about 3,000 Brewsters, even more preferably below about 2,500 Brewsters.

The desired optical article may be obtained by molding the polycarbonate or polycarbonate blend by injection molding, compression molding, extrusion methods and solution casting methods. Injection molding is the more preferred method of forming the article.

The methods of making the polycarbonates, end use applications, and additives that may be blended with the polycarbonates are the same as those described in section I of this specification, in reference to the polycarbonate suitable for use in an optical article.

As mentioned in reference to the polycarbonates in section I of this specification, the polycarbonate of the further aspect of the invention as defined in section II, and the optical articles made therefrom, may function as the medium for data storage, as in CD audio, CD ROM and read only DVD i.e. the data may be fixed onto or into the polycarbonate. The polycarbonate may also function as the substrate onto which a data storage medium is applied. Further, some combination of both functions may be employed in a single device, as for instance when the polycarbonate is imprinted with tracking to aid in reading a data storage medium which is applied to the polycarbonate.

EXAMPLES

The following examples are put forth so as to provide those of ordinary skill in the art with a complete disclosure and description of how the compositions of matter and methods claimed herein are made and evaluated, and not intended to limit the scope of what the inventors regard as their invention. Efforts have been made to insure accuracy with respect to numbers (e.g., amounts, temperatures, etc.) but some error and deviations should be accounted for. Unless indicated otherwise, parts are by weight, temperature is in °C. or is at room temperature and pressure is at or near atmospheric.

The materials and testing procedures used for the results shown herein are as follows:

Molecular weights are reported as weight average ($M_w$) and were determined by gel permeation chromotography relative to polystyrene.

Water absorption (% $H_2O$) was determined by ASTM procedure D-0570.

$T_g$ values were determined by differential scanning calorimetry.

$C_g$ values were determined as follows. The polycarbonate (7.0 grams) was charged to a heated mold having dimensions 5.0×0.5 inches and compression molded at 120° C. above its glass transition temperature while being subjected to applied pressure starting at 0 and ending at 2000 pounds using a standard compression molding device. After the required amount of time under these conditions the mold was allowed to cool and the molded test bar removed with the aid of a Carver press. The molded test bar was then inspected under a polaroscope and an observation area on the test bar located. Selection of the observation area was based on lack of birefringence observed and sufficient distance from the ends or sides of the test bar. The sample was then mounted in a device designed to apply a known amount of force vertically along the bar while the observation area of the bar was irradiated with appropriately polarized light. The bar was then subjected to six levels of applied stress and the birefringence at each level measured with the aid of a Babinet compensator. Plotting birefringence versus stress affords a line whose slope is equal to the stress optical coefficient $C_g$.

Cm values are reported at $T_g+100$ degrees Celcius. A rectangular sample was subjected to a known oscillary strain rate and the shear stress was monitored. Simultaneously, a polarized laser beam was sent parallel to the shear plane. The birefringence and orientation were measured by modulating the light with a electrooptic modulator and monitoring the in-phase and out of phase component of the wave at the detector as taught by Kanana, M. R. and Kornfield, J. A, *Journal of Rheology*, 1994, 38(4).

Example 1

A 500 mL Morton flask equipped with a magnetic stirrer, reflux condenser, dual nitrogen and phosgene inlet tube and exit tube attached to a base scrubbing system was charged with BCC (21.4 g, 72.3 mmol), SBI (4.24 g, 13.8 mmol), p-cumylphenol (0.82 g, 3.9 mmol, 4.5 mol %), methylene chloride (110 mL) and distilled water (80 mL). The reaction mixture was treated with 50 wt % NaOH to bring the pH to 10.5. Phosgene (17.0 g, 170 mmol, 100 mol % excess) was added at 0.6 g/min maintaining the pH at 10.5 by the addition of the NaOH solution. The chloroformate solution was treated with triethylamine (0.20 mL, 2 mol %) and a vigorous reflux ensued. The pH was maintained at 10.5. Under these conditions an analytical test for chloroformates indicated their complete absence after about 2 min. The resultant polymer solution was separated from the brine and washed once with 1N HCl and four times with distilled water. The polymer solution was precipitated into boiling water (750 mL) in a blender, washed with water (500 mL) and dried overnight at 125° C. under vacuum. The polymer had a Mw of 32,500 and a Tg of 149° C.

Example 2

BCC (19.62 g, 67.7 mmol), CD-1 (5.31 g, 19.8 mmol), p-cumylphenol (0.82 g, 3.9 mmol, 4.5 mol %) were reacted with phosgene as in Example 1 to afford after isolation a polycarbonate having a glass transition temperature of 148° C.

Example 3

A 500 mL Morton flask equipped as in example 1 was charged with BCC (26.9 g, 100 mmol), methylene chloride (125 mL) and distilled water (90 mL). The reaction mixture was treated with 50 wt % NaOH to bring the pH to 10.5. Phosgene (20.3 g, 205 mmol, 105 mol % excess) was metered into the reaction mixture at 0.6 g/min maintaining the pH at 10.5 by the addition of the NaOH solution. After 10.0 grams of phosgene had been added p-cumylphenol (1.06 g, 5.0 mmol, 5 mol %) was added. When the phosgene addition was complete triethylamine (0.125 mL, 0.9 mmol) was added and sufficient 50% NaOH was added to maintain the a pH of 10.9. After 2 minutes no chloroformates were detectable in the reaction mixture. Additional triethylamine (0.125 mL, 0.9 mmol) was added and additional phosgene (4.5 g, 45 mmol) was metered into the reaction mixture at 0.6 g/min. The polymer solution was separated from the brine and washed once with 1N HCl and four times with distilled water. The polymer solution was precipitated into boiling water (750 mL) in a blender, washed with water (500 mL) and dried overnight at 110° C. under vacuum. The polymer had a Tg of 138° C.

Example 4

BCC (24.0 g, 80 mmol), BPA (4.56 g, 20 mmol) and p-cumylphenol (1.06 g, 5 mmol, 5 mol %) were reacted with phosgene as in Example 3 to afford after isolation a polycarbonate having a glass transition temperature of 138° C.

Example 5

BCC (17.8 g, 60 mmol), BPA (9.12 g, 40 mmol) and p-cumylphenol (1.06 g, 5 mmol, 5 mol %) were reacted with phosgene as in Example 3 to afford after isolation a polycarbonate having a glass transition temperature of 139° C.

Example 6

A 500 mL Morton flask equipped as in example 1 was charged with BCC (22.2 g, 74.9 mmol), SBI (7.7 g, 25 mmol), dodecanedioic acid (DDDA, 1.24 g, 5.4 mmol) methylene chloride (125 mL) and distilled water (100 mL) and triethylamine (200 uL). The reaction mixture was treated with 50 wt % NaOH to bring the pH to 8.5. Phosgene (6 g, 60 mmol) was metered into the reaction mixture at 0.6 g/min maintaining the pH at 8.5 by the addition of the NaOH solution. At this point p-cumylphenol (0.95 g, 4.5 mmol) was added and an additional 1 g of phosgene was metered into the reaction mixtue at pH 8.5. Phosgenation was halted and the pH was raised to 11 by addition of 50% NaOH. Phosgene addition was resumed at pH 11 until a total of 15.1 g (50 mole % excess) phosgene had been added. At this stage the mixture tested positive for chloroformate groups. Triethylamine (200 uL) and a trace of 4-dimethyaminopyridine (several crystals) were added after which the mixture showed the absence of chloroformate groups. The polymer solution was separated from the brine and washed once with 1N HCl and four times with distilled water. The polymer solution was precipitated into boiling water (750 mL) in a blender, washed with water (500 mL) and dried overnight at 110° C. under vacuum. The polymer had a Tg of 143.7° C.

Example 7

A 1-liter glass melt polymerization reactor, which had been previously passivated by acid washing, rinsing and drying overnight at 70° C., was loaded with 136.9 g (639 mmol) of diphenyl carbonate, 157.5 g (531 mmol) of BCC and 26.5 g (86 mmol) of SBI. A 316 stainless steel helical stirrer was suspended in the powder and 151 microliters of tetramethylammonium hydroxide in the form of a 1.0 M aqueous solution and 461 microliters of sodium hydroxide in the form of a 0.001 M aqueous solution were added. The vessel was then evacuated and purged with nitrogen three times and heated to 180° C., whereupon the reaction mixture melted. Upon complete melting, it was allowed to thermally equilibrate for 5–10 minutes and then the mixture was heated at 210° C. for 30 minutes with stirring. The pressure was then reduced to 240 millibar, whereupon phenol began to distill from the reactor. After 45 minutes, the pressure was reduced to 130 millibar and heating (at 240° C.) was continued for 45 minutes with continued distillation of phenol. Polymerization was continued further with the following temperature/pressure profile: 260° C./90 millibar (30 minutes); 260° C./20 millibar (15 minutes); 270° C./3 millibar (30 minutes); 270° C./1 millibar (40 minutes); 300/1 millibar (90 minutes); 310° C./1 millibar (30 minutes). The polymer was then stranded from the reactor and cooled to give 170 g of slightly yellow strands (Mn=15100, Mw=35500, Tg=149° C.).

NaOH solution. Residual phosgene was removed from the reaction mixture by sparging with nitrogen. The resultant polymer solution was separated from the brine and washed once with 1N HCl and four times with distilled water. The polymer solution was precipitated into boiling water (750 mL) in a blender, washed with water (500 mL) and dried overnight at 125° C. under vacuum. The polymer had a Mn of 13,300 Mw of 42,500 and a Tg of 138° C. $^1$H—NMR indicated the presence of both BPM and BPI residues in a molar ratio of 55:45. The water absorption was 0.23%.

Table I summarizes the results of Examples 1–7 and comparative examples 1, 2 and 3

TABLE I

| Exple | mole % BCC | mole % SBI | mole % CD-1 | mole % BPA | % DDDA | Mw | Tg ° C. | Cg Brewster | Cm Brewster | % H2O*** |
|---|---|---|---|---|---|---|---|---|---|---|
| 1 | 84 | 16 | 0 | 0 | 0 | 32,500 | 149 | 43 | 2000 | 0.16 |
| 2 | 77 | 0 | 23 | 0 | 0 | 33,500 | 148 | 46 | 1900 | 0.153 |
| 3 | 100 | 0 | 0 | 0 | 0 | 35,200 | 138 | 47 | 2350 | 0.106 |
| 4 | 80 | 0 | 0 | 20 | 0 | 34,800 | 138 | 54.3 | 2910 | 0.127 |
| 5 | 60 | 0 | 0 | 40 | 0 | 33,300 | 139 | 59.7 | 3480 | 0.164 |
| 6 | 71 | 24 | 0 | | 5 | 50,700 | 144 | 44.6 | | |
| 7 | 84 | 16 | 0 | 0 | 0 | 35,500 | 149 | 38 | | |
| 8 | 60 | 0 | 0 | 40 | 0 | 37,400 | 136 | 57.1 | | |
| comp 1 | 0 | 0 | 0 | 100 | 0 | 33,000 | 145 | 81 | 4400 | 0.35 |
| comp 2 | 40 | 0 | 0 | 60 | 0 | | 140 | 68.4 | 3940 | 0.211 |
| comp 3* | | | | | | 42,500 | 138 | 44.5 | 2700 | 0.23 |

*BPM:BPI = molar ratio of 55:45

Example 8

Diphenyl carbonate (156.8 g, 732 mmol) DMBPC (120.5 g, 407 mmol), BPA (61.9 g, 271 mmol), 307 microliters of tetramethylammonium hydroxide in the form of a 1.0 M aqueous solution and 460 microliters of sodium hydroxide in the form of a 0.001 M aqueous solution were polymerized as in example 7 above. The polymer was then stranded from the reactor and cooled to give 172 g of nearly colorless strands (Mn=16600; Mw=37400, Tg=136° C.).

Comparative Example #1

BPA homopolycarbonate (LEXAN, optical quality grade, manufactured by interfacial polymerization).

Comparative Example #2

BCC (11.8 g, 40 mmol), BPA (13.7 g, 60 mmol) and p-cumylphenol (1.06 g, 5 mmol, 4.5 mol %) were reacted with phosgene as in Example 3 to afford after isolation a polycarbonate having a glass transition temperature of 140° C. The water absorption with 60 mol % BPA is 0.211%.

Comparative Example #3

A 500 mL Morton flask equipped as in Example 1 was charged with (4,4'-(m-phenylenediisopropylidene)diphenol (BPM) (19.0 g, 55 mmol), (1,1-bis(4-hydroxyphenyl)-3,3,5-trimethylcyclohexane (BPI) (13.9 g, 45 mmol), p-tert-butylphenol (0.68 g, 4.5 mmol, 4.5 mol %), methylene chloride (125 mL), distilled water (90 mL) and triethylamine (200 uL). The reaction mixture was treated with 50 wt % NaOH to bring the pH to 10.5. Phosgene (15.2 g) was added at 0.6 g/min maintaining the pH at 10.5 by the addition of the The invention has been described in detail with particular reference to preferred embodiments thereof, but it will be understood that variations and modifications can be effected within the spirit and scope of the invention.

We claim:

1. An optical article comprising
    (1) from 90 to 100% by weight of a polycarbonate having structural units of the formula

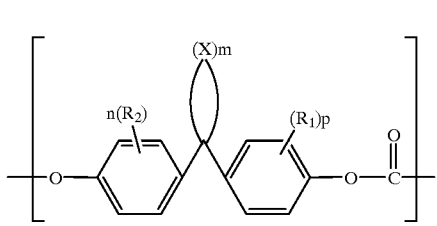

(I)

wherein $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from 90 to 100 mol % of the polycarbonate; where the polycarbonate has a glass transition temperature of from about 120° C. to about 185° C. and a water absorption of below about 0.33%; and (2) from 0 to 10% by weight of further additives.

2. The optical article of claim 1, wherein component (1) is a polycarbonate comprising residues selected from the group consisting of residues of 1,1-bis(4-hydroxy-3-methylphenyl)cyclohexane; 1,1-bis(4-hydroxy-3-methylphenyl)cyclopentane; 1,1-bis(4-hydroxy-3-methylphenyl)cycloheptane and mixtures thereof.

3. An optical article comprising
  (1) from 90 to 100% by weight of a homopolycarbonate having structural units of the formula

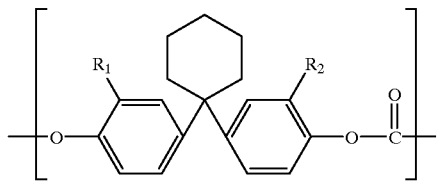

where $R_1$ and $R_2$ are $CH_3$; where the polycarbonate has a glass transition temperature of below about 150° C. and a water absorption of below about 0.15%; and
  (2) from 0 to 10% by weight of further additives.

4. The optical article of claim 3, wherein the homopolycarbonate has a $C_g$ of below about 50 Brewsters and a $C_m$ of below about 2500 Brewsters.

5. The optical article of claim 1, wherein the optical article is a medium for optical data storage.

6. The optical article of claim 3, wherein the optical article is a medium for optical data storage.

7. An optical article consisting essentially of
  (1) from 90 to 100% by weight of a homopolycarbonate having structural units of the formula

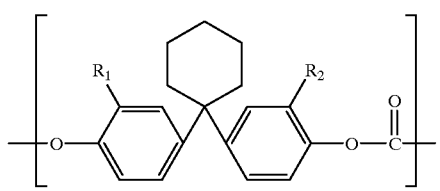

where $R_1$ and $R_2$ are $CH_3$; where the polycarbonate has a glass transition temperature of below about 150° C. and a water absorption of below about 0.15%; and
  (2) from 0 to 10% by weight of further additives.

8. The optical article of claim 7, wherein the optical article is a medium for optical data storage.

9. A polycarbonate comprising structural units of the formula (I):

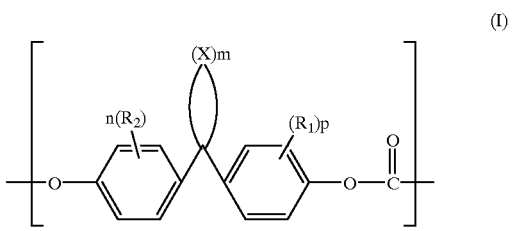

where $R_1$ and $R_2$ are independently selected from the group consisting of $C_1$–$C_6$ alkyl;

X represents $CH_2$;

m is an integer from 4 to 7;

n is an integer from 1 to 4; and p is an integer from 1 to 4 with the proviso that at least one of $R_1$ or $R_2$ is in the 3 or 3' position; and wherein the structural units of formula (I) comprise from 90 to 100 mol % of the polycarbonate; where the polycarbonate has a glass transition temperature of from about 120° C. to about 185° C. and a water absorption of below about 0.33%.

10. The polycarbonate of claim 9, where structure (I) is selected from the group consisting of residues of 1,1-bis(4-hydroxy-3-methylphenyl)cyclohexane; 1,1-bis(4-hydroxy-3-methylphenyl)cyclopentane; 1,1-bis(4-hydroxy-3-methylphenyl)cycloheptane and mixtures thereof.

11. The polycarbonate of claim 9, wherein the polycarbonate comprises residues of BCC.

12. The polycarbonate of claim 9, wherein structure (I) is BCC and wherein the polycarbonate consists of 100 mol % BCC.

13. The polycarbonate of claim 9, wherein $R_1$ and $R_2$ are in the 3 and 3' positions, respectively, and n and p are both equal to 1.

14. The polycarbonate of claim 9, wherein the polycarbonate has a $C_g$ of below about 50 Brewsters and a $C_m$ of below about 2500 Brewsters.

15. The polycarbonate of claim 11, wherein the polycarbonate has a $C_g$ of below about 50 Brewsters and a $C_m$ of below about 2500 Brewsters.

* * * * *